United States Patent
Carter et al.

[11] Patent Number: 6,065,238
[45] Date of Patent: May 23, 2000

[54] METHOD FOR RELEASING AIR FROM THE SWIM BLADDER OF A FISH

[76] Inventors: Jesse M. Carter, 910 5. S. Rome Ave., Tampa, Fla. 33606; Jack V. Smith, 8505 42nd Ave. N., St. Petersburg, Fla. 33709

[21] Appl. No.: 09/093,172

[22] Filed: Jun. 8, 1998

[51] Int. Cl.$^7$ .................................................. A01K 97/00
[52] U.S. Cl. ........................................................ 43/4; 43/1
[58] Field of Search .............................. 43/1, 4, 5, 53.5; 84/402, 403, 410, 384; 116/112, 137 R, 67 R; 452/69; D24/112; 223/102; 604/272, 239

[56] References Cited

U.S. PATENT DOCUMENTS

| | | | |
|---|---|---|---|
| Re. 24,902 | 12/1960 | Dillard | 43/53.5 |
| D. 254,444 | 3/1980 | Levine | D24/112 |
| 256,738 | 4/1882 | Reckendorfer et al. | 116/137 R |
| D. 263,874 | 4/1982 | Genese | D24/112 |
| D. 263,875 | 4/1982 | Genese | D24/112 |
| D. 264,132 | 4/1982 | Genese | D24/112 |
| D. 282,285 | 1/1986 | Levy | D24/112 |
| 700,864 | 5/1902 | Weinberg | 116/137 R |
| 716,568 | 12/1902 | Moore | 116/137 R |
| 998,488 | 7/1911 | Ferguson | 116/137 R |
| 1,150,387 | 8/1915 | Roberts | 452/69 |
| 1,315,019 | 9/1919 | Heyer | 116/137 R |
| 1,417,332 | 5/1922 | Keller | 116/137 R |
| 1,624,873 | 4/1927 | Landis | 116/137 R |
| 1,626,198 | 4/1927 | Landis | 116/137 R |
| 1,683,148 | 9/1928 | Backstatter | 116/112 |
| 1,779,795 | 10/1930 | Backstatter | 116/137 R |
| 2,164,907 | 7/1939 | Falkner | 43/53.5 |
| 2,748,769 | 6/1956 | Huber | D24/112 |
| 3,029,815 | 4/1962 | Roehr | 604/272 |
| 3,050,896 | 8/1962 | Parker | 43/4 |
| 3,076,457 | 2/1963 | Copen | 604/272 |
| 3,277,893 | 10/1966 | Clark | D24/112 |
| 3,403,466 | 10/1968 | Young | 43/4 |
| 3,460,255 | 8/1969 | Hutson | D24/112 |
| 4,073,083 | 2/1978 | Davis | 43/4 |
| 4,706,403 | 11/1987 | Reynolds | 43/4 |
| 5,228,226 | 7/1993 | Porosky | 43/5 |
| 5,250,066 | 10/1993 | Lambert | 604/272 |
| 5,283,920 | 2/1994 | Plummer | 43/4 |
| 5,548,917 | 8/1996 | Holwadel | 43/1 |
| 5,600,914 | 2/1997 | Tatar | 43/4 |
| 5,817,074 | 10/1998 | Racz | 604/272 |

OTHER PUBLICATIONS

Environmental News Network, "Fish Survival: catch, deflate and release", Mar. 3, 1999.

*Primary Examiner*—Michael J. Carone
*Assistant Examiner*—Darren W. Ark

[57] ABSTRACT

A device designed for releasing air from the bladder of a fish brought up from depth. Depth is defined as water exceeding 33 feet deep. This device releases air from the bladder of a fish brought up from depth by puncturing the swim bladder of said fish, and consisting of an elongated hollow tubular cannula having an axially extending lumen therethrough, with a means for producing an audible, visible, mechanical or electrical alert signal activated by the movement of air.

1 Claim, 3 Drawing Sheets

METHOD FOR RELEASING AIR FROM THE SWIM BLADDER OF A FISH

BACKGROUND OF INVENTION

1. Field of the Invention

This novel invention relates to a device designed to release excess air from the bladder of a fish brought up from "depth". Depth is defined as a column of water exceeding 33 feet.

2. Description of the Related Art

It is commonly known the swim bladder of fish caught by hook and line, net or other means expands due to the air contained in it, if the fish is brought up faster than it is able to expel air and therefore maintain a constant volume of air in its bladder. This is caused by the rapid change in depth and a concomitant change in pressure. The pressure is a product of the weight of the water column. The ambient pressure exerted on an object increases by 1 atmosphere with every 33 feet of depth. An example to illustrate this principle is as follows. Air is added to a balloon at a depth of 66 feet and the open end is tied off. If it is then taken to a depth of 99 feet, it will be one half its original size, and therefore contain only one half the volume of air it did at 66 feet because the pressure has doubled. Conversely, if the balloon is taken up to a depth of 33 feet, it would double in size. Under normal conditions, a fish will regulate the volume of air in its bladder as it changes depth. If, on the other hand, a fisherman brings a fish up from depths greater than 33 feet faster than said fish can expel air from its bladder (in order to keep bladder volume constant), the bladder will expand rapidly and attain a size much larger than normal. It may become too large to fit in the fish's body cavity and is consequently expelled out through its anus. When this occurs the fish cannot swim back to depth until the bladder has released this excess air. A large percentage of fish caught in deep water are often too small (undersized) to legally keep without violating the federal and local laws on size limits. Federal and state regulations also may regulate catch totals for specific species. Once these "bag limits" are equaled any additional fish of the same species that are caught must be released. These released fish have little chance of survival from predators, boats or other dangers because of their inability to return to depth rapidly due to their expanded swim bladder.

The fisheries of the world's oceans, lakes, and rivers are being depleted of this precious, natural resource at an unprecedented rate. By increasing the survivability of released fish this resource stands a much better chance of withstanding mankind's demand on this food source. Government agencies are constantly evaluating the "health" of our fisheries. These evaluations often lead to rules reducing the number of a specific species of fish which can be caught. In many cases, regulations demand that fish reach a minimum size before it can be taken. These rules are enacted when a species is under excessive pressure, or risk of extinction. These regulations lead to the release of many fish. A high percentage of released fish die, however, because of a distended swim bladder. On the other hand, the majority of fish are hardy enough to survive puncture of their swim bladder, return to their habitat, and survive. The present device provides a sound method to enable fishing enthusiasts everywhere to do this task effectively and with little effort. The uniqueness and novelty of this device has not been taught by any prior art.

SUMMARY OF THE INVENTION

Accordingly, the invention includes a means for releasing excess air from the bladder of a fish brought up from depth. Depth can be defined as water exceeding 33 feet deep. The present invention provides a hollow needle for releasing air from the swim bladder of fish, and has certain very specific advantages in design and operation. The needle of this invention consists of an elongated hollow tubular cannula having an axially extending lumen therethrough. Adding to the uniqueness of this device is its ability to produce an audible, visible, mechanical, or electric signal that indicates to the operator that said needle has been properly inserted into the swim bladder of the fish. One means to accomplish this is to produce a "whistling" sound via an aperture that is formed by a flat cut made diagonally to the axis of the hollow cannula needle approximately half way between the sharpened needle point (distal end) and the handle or opposite end. This cut extends approximately halfway through the cannula needle. Said cut can be varied in shape and size to produce sound of varying pitch when air is passed rapidly through the needle. This sound signals the operator that said fish bladder has been pierced, and no further penetration is required.

Another way to measure the air flow through the device is via an anemometer incorporated into the device. If the anemometer's mechanical "paddle" is rotated by the movement of air through the cannula, this mechanical motion is then converted to a signal which can be seen or heard. This signal may take the form of a mechanical gauge or an LED readout. In addition, the anemometer's signal may be converted or amplified by batteries, solar power, engine alternator, shore power, or other means. The present device can be activated to emit sound(s) constantly, or intermittently.

This device may take many forms including a hollow cannula with a sharpened distal end, and an aperture that produces sound when air passes through the cannula. This invention can be attached to a pocket knife, screwdriver, or other tool. Alternatively, the hollow cannula with a sharpened distal end and an aperture to produce sound when air passes through the cannula may be attached to a discrete handle. Finally, the sharpened, hollow cannula may be placed inside a hollow tube of slightly larger diameter to permit the smooth movement of the smaller, inner cannula. A solid shaft of the same diameter as the inner, hollow cannula is also mounted, and spring-loaded into the outer hollow tube in such a way that if the spring is at rest, the inner, sharpened, hollow cannula is concealed inside the outer tube. When used to puncture a swim bladder, the solid, spring-loaded shaft is depressed thereby pushing the inner, hollow cannula out through the opposite end of the outer tube far enough to allow it (inner cannula) to puncture the swim bladder of a fish and release the excess air in it. This configuration provides maximum safety to the human operator by preventing accidental puncture of said operator, because the sharpened end is exposed only when in use.

Summed up, the present invention is a device to release air from the bladder of a fish brought up from depth by puncturing the swim bladder of said fish, and consisting of an elongated hollow tubular cannula having an axially extending lumen therethrough, with a means for producing an audible, visible, mechanical, or electric alert signal activated by the movement of air. Thus, this invention is particularly useful for releasing air from the swim bladder of fish while alerting the operator that said needle has been properly inserted into the bladder of a fish. This device provides a single cohesive system that is designed to work with a minimum of effort by the individual catching fish, and thereby result in the favorable outcome of saving fish by reducing the length of time said fish must remain on the surface of the water. The environmental and ecological impact on the fish and the fisheries may be very significant.

BRIEF DESCRIPTION OF THE DRAWINGS

The features and benefits of the invention are best understood by those having ordinary skill in the art by reference to the following detailed description when considered in conjunction with the accompanying drawings as described below. The drawings are not necessarily to scale, emphasis instead being placed upon illustrating the principles of the invention. The swim bladder relief device (SBR) is approximately 3 to 6 inches in length and approximately 1 to 10 mm in diameter. The size, shape, matrix, and weight can vary depending upon manufacturing processes such as injection molding or machining, and materials employed, such as plastic, metals, or composites. In addition, the invention's size may vary depending on the size of fish to be treated and released.

DETAILED DESCRIPTION OF THE INVENTION

Figure 1:
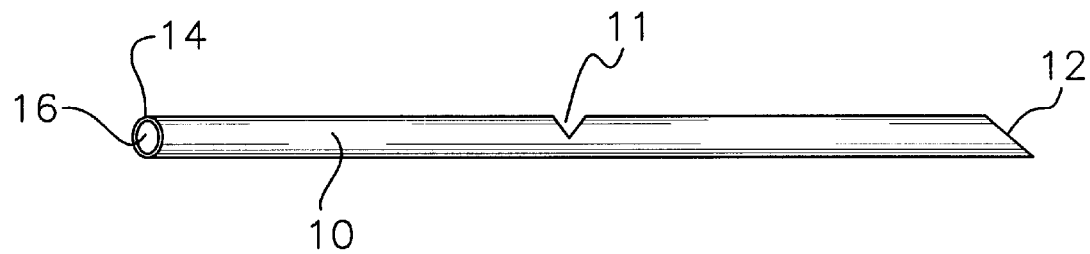
FIG. 1 is a front elevation of the swim bladder relief needle with an aperture for sound according to the present invention.
Figure 2:
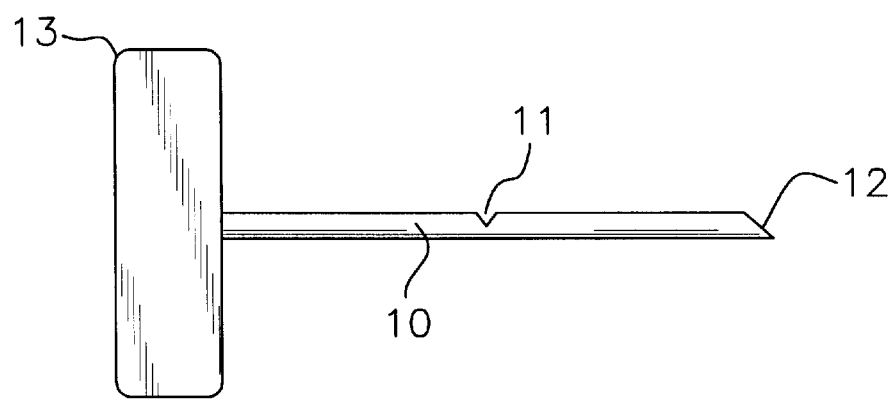
FIG. 2 is a front elevation of the needle used in conjunction with a supporting handle.

Throughout the following detailed description, the same reference numerals refer to the same elements in all figures. The present invention is a device that includes a means for releasing air under pressure from the bladder of a fish brought up from depth. It will be referred to henceforth as the Swim Bladder Relief device or SBR. Depth can be defined as water exceeding 33 feet deep. The present invention provides a hollow needle for releasing air from the swim bladder of fish, and has certain, specific advantages in design and operation. The needle 10 of this invention as depicted in FIGS. 1, 2, 4, 5 and 6 consists of an elongated hollow 16 tubular cannula having an axially extending lumen therethrough. Adding to the uniqueness of this device is its ability to produce an audible, visible, mechanical, or electric signal that indicates to the operator that said needle has been properly inserted into the swim bladder of the fish. One means to accomplish this is to produce a "whistling" sound via an aperture 11 that is formed by a flat cut diagonal to the axis of the hollow cannula needle 10 approximately half way between the sharpened needle point 12 (cutting edge) at the distal end and the handle 13 as shown in FIG. 1 and FIG. 2. This aperture 11 (cut) can be varied in shape and size to produce sound of varying pitch when air is passed rapidly through the needle.

The technique of releasing air from the swim bladder of fish using the present device is described below and may be utilized by all of the variations taught herein. Insert the SBR's sharpened edge 12 through the body wall on the underside of the abdomen of said fish well below its pectoral fin while gently squeezing the fish to force the excess air out through the needle 10. The SBR will emit a sound through the aperture 11 indicating puncture of the fish's bladder, if it has been properly inserted. This should be done quickly and promptly after the fish has been caught. The SBR signaling system alerts the operator that said device has been inserted properly. Without this unique signal to alert the operator of proper insertion, deflation may not be accomplished. Alternatively, the fish may be damaged by repeated squeezing if the operator does not know when or if the needle has punctured the swim bladder. Repeated and excessive squeezing to remove the air from the fish's bladder may cause irreparable damage, and ultimately kill the fish.

Figure 3:
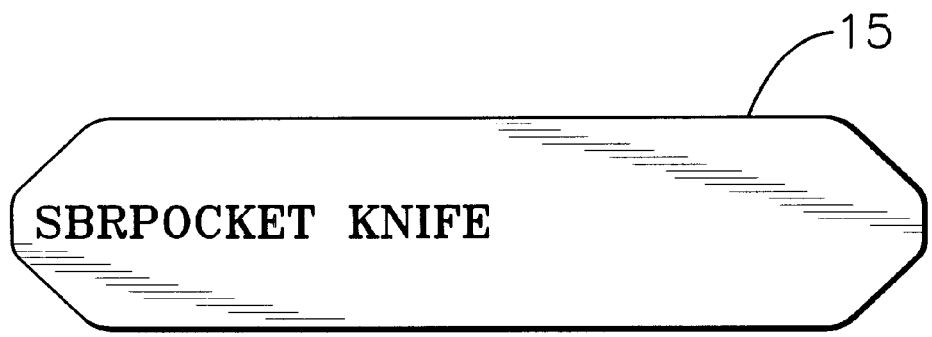
FIG. 3 is a cross-sectional view of the needle used in conjunction with a pocket knife with the needle in the closed position.
Figure 4:
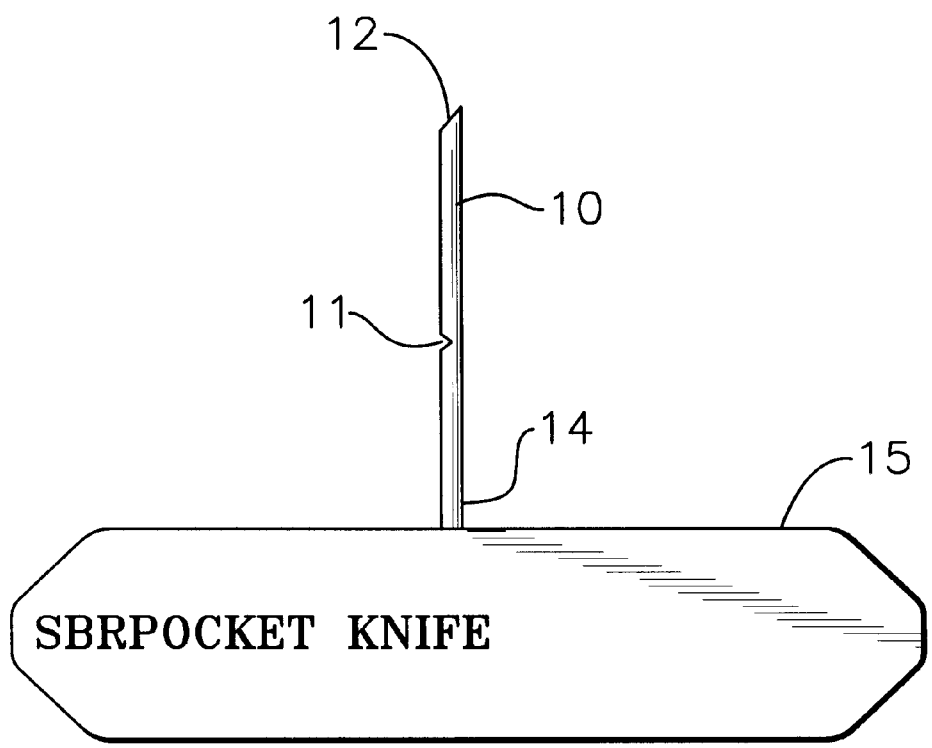
FIG. 4 is a cross-sectional view of the needle used in conjunction with a pocket knife with the needle in the open position.

Another method to utilize this unique invention is demonstrated in FIGS. 3 and 4. These examples show the needle 10 attached to a pocket knife 15 as shown in FIG. 4 with the needle 10 extended and ready for use. FIG. 3 demonstrates the device with the needle in the closed position and not visible. The needle 10 of FIG. 1 can be connected to the pocket knife 15 directly as shown in FIG. 4. The proximal end 14, opposite of the distal, sharpened end 12, can be connected to the pocket knife 15 in such a manner as to allow the needle 10 to be extended out from the inside of the knife 15 so that it is perpendicular to the knife 15. This example of the present device allows for a safe and efficient manner for the device 10 to be stored before and after use.

Figure 5:
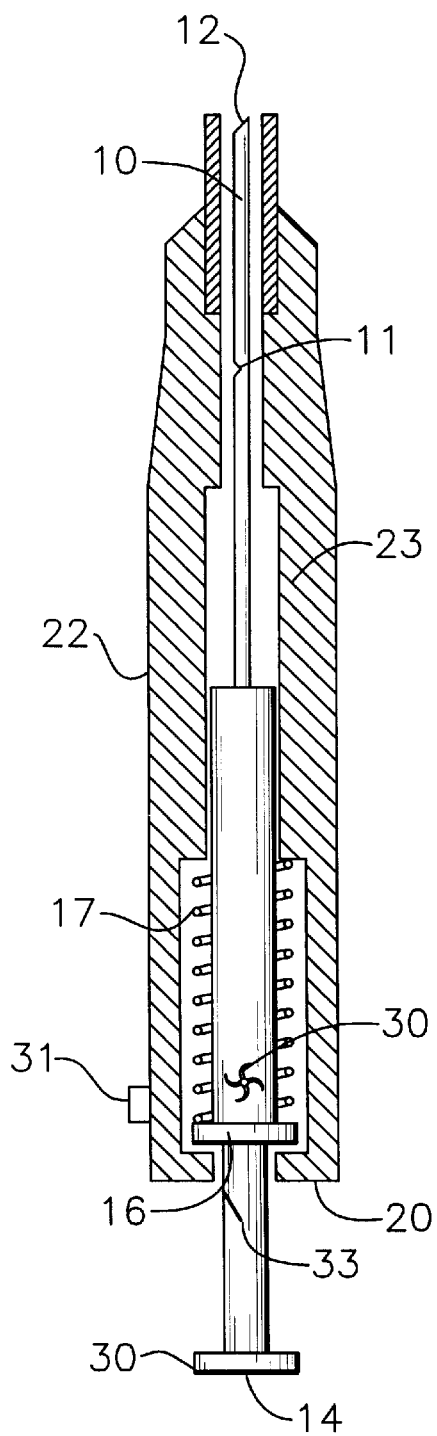
FIG. 5 is a cross-sectional view of the needle used inside of another hollow cannula when the needle is not depressed or extended for use.
Figure 6:
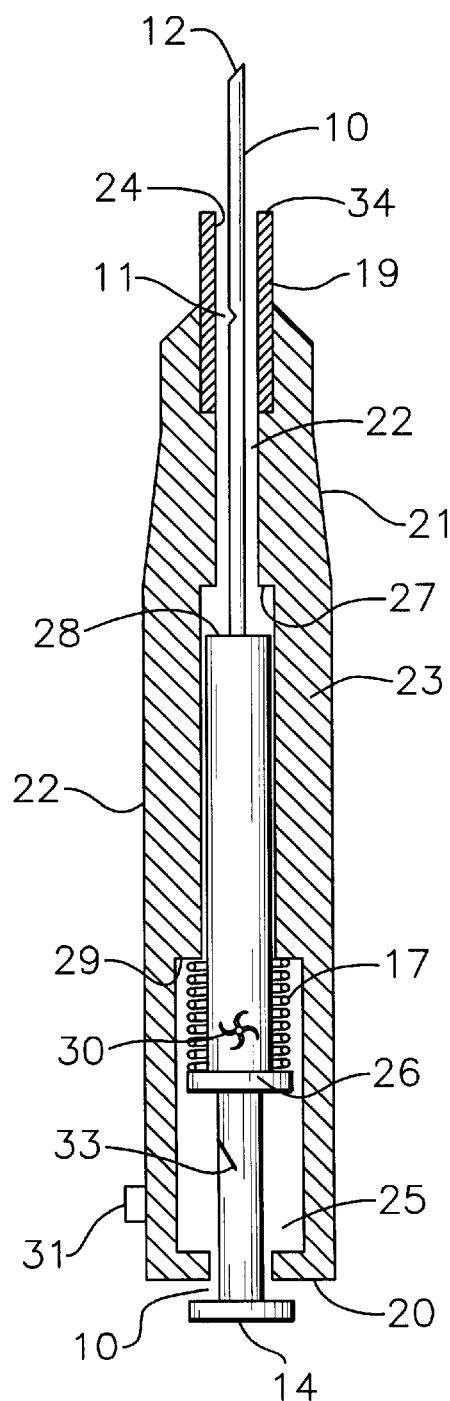
FIG. 6 is a cross-sectional view of the needle inside of another hollow cannula when the needle is depressed or extended for use.

Another method for the needle 10 of the FIG. 1 device to work efficiently and to provide a safe manner for said device to be used while reducing the hazard to the user is illustrated in FIG. 5 and 6. Note, the device of FIG. 5 has the needle 10 in the storage position (at rest), and FIG. 6 illustrates the device in use with the plunger 14 depressed. The SBR 22 as further shown in FIG. 6 consists of an outer cannula 23 open at a first end 20 and second or distal end 34. The cannula 23 has an outer surface 19 and an inner surface 24, enclosing a channel 32. The hollow cannula of the needle's 10 distal end 12 is used as a needle point to be inserted into the swim bladder of fish allowing air under pressure to pass through the distal end 12 and exit through the opening at the opposite end 14. A resilient means 17 encircles the needle 10 and forces it back into the channel 32 after downward pressure has been released on the plunger 14. The resilient means 17 is preferably made of metal, but other materials are suitable. A coil spring is the preferred resilient means. The outer surface 21 of the cannula provides a place to grip the SBR 22 (see FIG. 6) by the operator's hand. The cannula 23 is preferably made of high impact plastic and the needle 10 is preferably made of stainless steel or other non-rusting metal. Plastic may be substituted for metal, if it is strong enough to penetrate the outer surface of a fish and puncture its swim bladder. The tip 12 at the distal end of the cannula is sharpened and cut as described in FIG. 1. The inner wall 24 of the cannula has three ledges. The first ledge 25 is juxtaposed to a first flange 26 on the needle 10 when the needle is at rest (as shown in FIG. 5). A second ledge 27 acts as a stop for flange 28 on needle 10. A third ledge 29 provides a stop for the coil spring 17 so that needle 10 returns to a resting position when spring 17 is no longer squeezed between flange 26 and 29 when the needle is depressed as shown in FIG. 6. The invention as described by FIG. 1 through 6 may employ a number of methods for alerting the operator that a swim bladder has been punctured. The device may have an aperture 11 which will produce an audible sound or whistle when air passes through the aperture, or the device may have an anemometer 30 as shown in FIG. 5 and 6. Said anemometer detects the passage of air, and relays this information by electrical, mechanical, visual, or other means to a device 31 which then produces a measurable response. Said response may take the form of audible, electrical, visual, or mechanical manifestation. Also illustrated in FIGS. 5 and 6 is the use of a reed 33 made of wood, plastic, metal or other suitable material that will produce sound when placed in the hollow cannula of the needle 10. Said reed produces sound when air is passed rapidly through said tube.

To sum up this detailed description, the present invention is a device to release air from the bladder of a fish brought up from depth by puncturing the swim bladder of said fish, and consisting of an elongated hollow tubular cannula having an axially extending lumen therethrough, with a means for producing an audible, visible, mechanical, or electric alert signal activated by the movement of air.

While the invention has been particularly shown and described with reference to a preferred embodiment thereof, it will be understood by those skilled in the art that various changes in form and detail may be made therein without departing from the spirit and scope of the invention. The specific embodiments described are given by way of example only and the invention is limited only by the terms of the appended claims.

Having thus described the invention, what is claimed and secured by Letters Patent is:

1. A method for releasing air from the swim bladder of a fish comprising the steps of:

providing a device to release air from the bladder of a fish, the device having an elongated hollow tubular cannula having first and second ends, an axially extending lumen therethrough, and a means for producing a detectable alert signal activated by the movement of air through the cannula, the means for producing a detectable alert signal comprising an aperture which is cut through a wall of the cannula at a position intermediate the first and second ends;

inserting one of said first and second ends through the body wall on the underside of the abdomen of the fish below its pectoral fin;

puncturing the swim bladder of a fish to thereby release the air within the swim bladder.

\* \* \* \* \*